United States Patent [19]
Glaza

[11] 3,840,308
[45] Oct. 8, 1974

[54] STRUCTURAL SUPPORTING COMPLEX
[75] Inventor: Gordon K. Glaza, Midland, Mich.
[73] Assignee: The Dow Chemical Company, Midland, Mich.
[22] Filed: Sept. 27, 1972
[21] Appl. No.: 292,846

[52] U.S. Cl. .............................................. 404/35
[51] Int. Cl. ............................................. E01c 9/08
[58] Field of Search ............ 404/35, 34, 38, 40, 41, 404/42; 52/585, 586, 588

[56] References Cited
UNITED STATES PATENTS

| | | | |
|---|---|---|---|
| 69,297 | 9/1867 | Stafford | 404/40 X |
| 400,013 | 3/1889 | Steinberg | 404/41 |
| 1,778,352 | 10/1930 | Bruce | 404/41 X |
| 1,974,130 | 9/1934 | Wedberg | 404/41 X |
| 3,238,855 | 3/1966 | Clay | 404/42 |
| 3,319,543 | 5/1967 | Braeuninger | 404/35 |
| 3,348,459 | 10/1967 | Harvey | 404/35 |
| 3,538,819 | 11/1970 | Gould | 404/35 |
| 3,614,915 | 10/1971 | Perry | 404/40 |

Primary Examiner—Nile C. Byers, Jr.
Attorney, Agent, or Firm—William M. Yates; Robert W. Selby; Lloyd S. Jowanovitz

[57] ABSTRACT

A structural supporting complex with detachable interlocking rectangular panels positioned with discontinuous linearly extending joints between such panels. The supporting complex is especially resistant to bow wave and rutting common to panel-type aircraft landing mats.

21 Claims, 4 Drawing Figures

PATENTED OCT 8 1974  3,840,308

STRUCTURAL SUPPORTING COMPLEX

BACKGROUND OF THE INVENTION

This invention relates to a structural supporting complex and more in particular pertains to a plurality of interlocking panels adapted to provide a load supporting surface suitable for use as a roadway, aircraft runway, and the like.

Load supporting surfaces suitable for use as, for example, aircraft runways have previously been sucessfully employed. Perry, U.S. Pat. No. 3,572,224 depicts landing mats having a plurality of planks or panels extending in parallel rows in a direction either parallel or perpendicular to the flight path of an aircraft. Although such configurations have proven to be generally satisfactory, they are susceptible to what is known in the art as "bow wave" and "rutting." Load supporting structures with panels positioned with continuous linearly extending joints generally parallel to the flight path are susceptible to "rutting," i.e., the juncture between the rows parallel to the flight path, and the earth directly below such joints, depresses as an aircraft passes thereover. Load supporting structures with panels positioned with continuous linear joints extending in a direction generally perpendicular to the flight path are susceptible to "bow wave," i.e., a wave-like motion of the supporting structure proceeding in the flight path direction as an aircraft lands. Constant exposure of a supporting structure to bow wave and rutting can result in the disengagement of individual panels within the load supporting complex.

It is desired to provide an improved structural supporting complex which minimizes the aforementioned difficulties.

SUMMARY OF THE INVENTION

The novel structural supporting complex of this invention comprises a plurality of panels suitably detachably interlockingly positioned adjacent to each other with discontinuous linearly extending joints therebetween. The panels can be, for example, honeycomb type structures or elongated plate-like top and bottom members joined by spaced apart generally longitudinally extending web members running from end to end of the top and bottom members; when viewed in transverse cross-section, the top and bottom members and the web members define a plurality of channels. The panels further have suitable connecting means on the longitudinal and transverse edges thereof adapted to detachably join together the panels into a strong, load bearing supporting complex resistant to rutting and bow wave.

DESCRIPTION OF THE DRAWING

The accompanying drawing further illustrates the invention.

Identical numerals, distinguished by a letter suffix, within the several figures represent parts having a similar function within the different embodiments.

DESCRIPTION OF THE PREFERRED EMBODIMENTS

Figure 1:
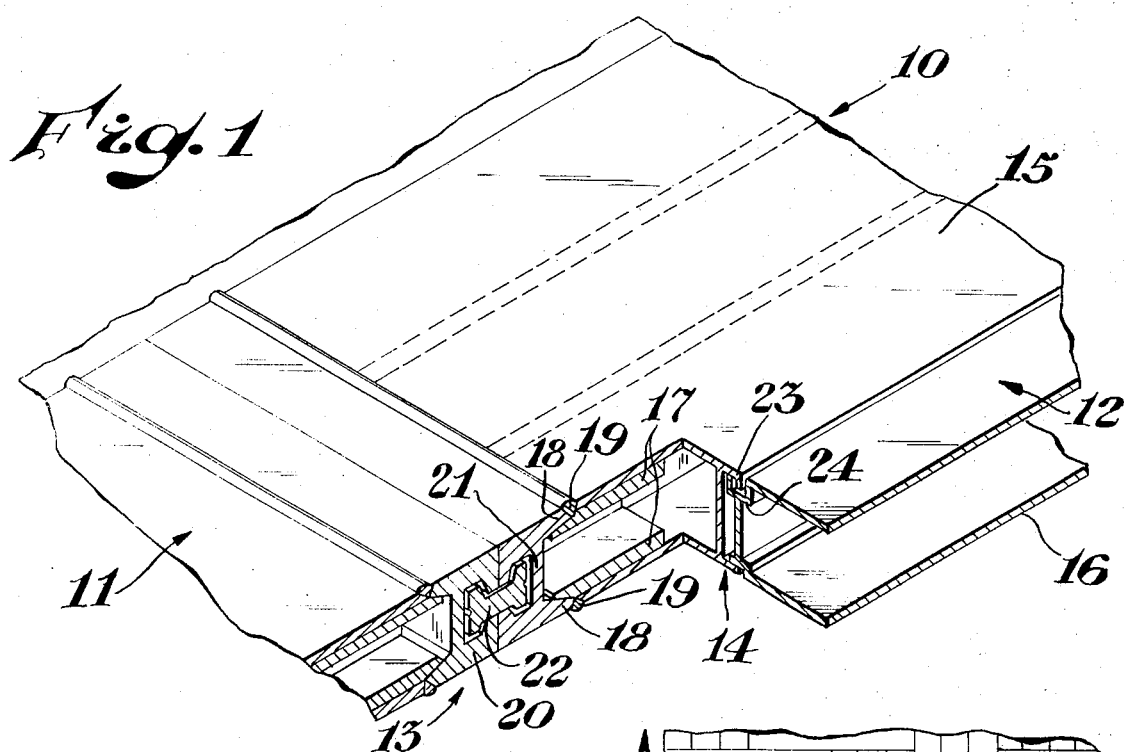
FIG. 1 is an isometric view, partially broken away, showing three support members joined together by suitable connecting means.

In FIG. 1 are first, second and third support-members, such as mats or panels 10, 11 and 12, preferably detachably joined together by first and second connecting means 13 and 14 respectively. The support members 10, 11 and 12 have an upper surface 15, a lower or base surface 16 and optional slidable tubular members or inserts 17. The ends of the inserts 17 are, for example, welded to the adjacent web ends and machined to act as a seat for receptor members 18 of the first connecting means 13. The receptor members 18 are attached to the inserts 17 by, for example, welds 19.

The first connecting means 13 preferably includes complementary connectors 20 and 21 adapted to detachably join together. A locking bar 22 is preferably adapted to be slidably received within suitable receptacles in the connectors 20 and 21. Upon insertion of the locking bar 22 within such receptacles the connectors 20 and 21 strongly detachably interlock the first and second panels 10 and 11. Such interlocking connection is released by slidably removing the locking bar 22.

The second connecting means 14 is preferably of a two piece configuration adapted to matingly engage with each other to provide a strong releasable link between the panels 10 and 12. The second connecting means 14 is preferably at least partially formed by edge 23 of the first panel 10 and edge 24 of the third panel 12 which are extruded to form suitable complementary interlocking configurations.

To provide a lightweight and high strength structure, it is usually desirable to construct the panels 10, 11 and 12 and the connecting means 13 and 14 of a light metal such as aluminum or aluminum alloys; however, metals such as magnesium, steel, titanium, and the like can be employed. Any basic panel of the herein described type is useful if it is substantially hollow or filled with passages and is provided with a surface or other means for attaching the connecting means thereto by, for example, bolting, clamping, and preferably welding.

Figure 2:
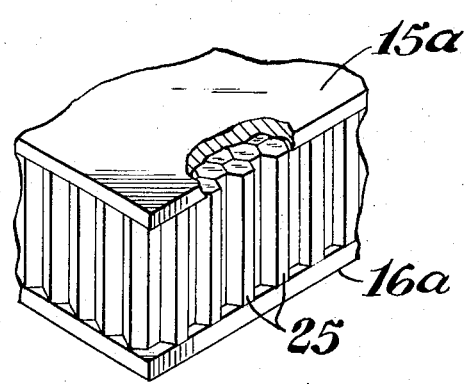
FIG. 2 is an isometric view, partially broken away, of another embodiment of the support member.

FIG. 2 is illustrative of another embodiment of a panel employable in the described structural supporting complex. Upper surface 15a is spaced apart from a lower surface 16a by a plurality of rigid, hollow honeycomb members 25. Suitable connecting means (not shown) are affixed to the edges of the honeycomb panel to provide means to detachably connect adjacent panels.

Figure 3:
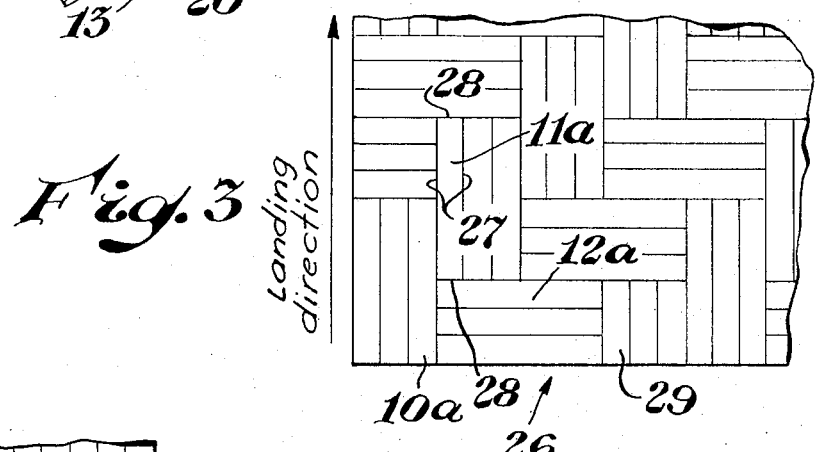
FIG. 3 is a plan view of a plurality of support members joined together to form a structural supporting complex.

In FIG. 3 is depicted a structural supporting complex generally represented by the numeral 26. The complex 26 includes a plurality of panels, represented partially by panels 10a, 11a, and 12a, and connecting means (not shown) as hereinbefore described for FIG. 1.

Referring now to the longitudinally extending panel 11a, which is representative of all of the similarly orientated panels in the supporting complex 26, longitudinal edges 27 preferably include the second connecting means (not shown) hereinbefore described for FIG. 1, detachably attached to the longitudinal and transverse edges of the adjacent panels. Transverse edges 28 of the panel 11a preferably include the hereinbefore described first connecting means (not shown) removably attached to a longitudinal edge of the panel adjacent thereto.

The transversely extending panel 12a is of similar design to the panel 11a except that the longitudinal and transverse edges thereof preferably include the hereinbefore described first and second connecting means (not shown), respectively.

To obtain a strong supporting complex, resistant to both rutting and bow wave, it is necessary to suitably position the panels to have discontinuous linearly extending joints between the various panels.

The joints between the panels do not extend linearly, i.e., in a straight line, in any direction either entirely across or lengthwise along, for example, an aircraft landing strip in a direction coincident with the landing path of an aircraft. Preferably the joints extend in a linear direction for a distance necessary to strongly join together the panels into a unitized supporting complex capable of dispersing the forces incurred during the landing of an aircraft or passage thereon of a vehicle and resist rutting and bow wave. The joints between the various panels preferably extend in a single direction for up to about one and one-half times the length of the panel.

To readily position the panels adjacently together to have discontinuous linearly extending joints, it is necessary that the longitudinal edge 27 be of an integer multiple dimension (greater than one) of the transverse edge 28 dimension. Preferably the longitudinal dimension is two to six times the transverse dimension.

The panels in FIG. 3 are positioned in a plurality of substantially rectangular, longitudinally adjacently detachably interlocked multi-panel groups. About one-half of the panel groups extend in a direction with the longitudinal edges thereof generally parallel to, for example, the landing direction of an aircraft. Panel groups within longitudinally extending rows are preferably spaced apart by at least two generally transversely extending panel groups, i.e., the longitudinal edges of the panels within such transverse groups are generally perpendicular to the landing direction.

To provide a uniform edge along the side of a road or landing mat, at least one panel insert 29 of predetermined dimensions is inserted in open areas between the longitudinally and transversely extending panel groups.

Figure 4:
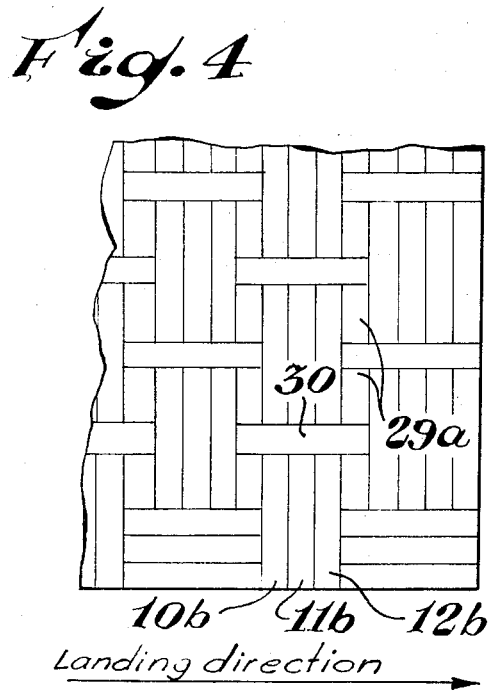
FIG. 4 is a plan view of another embodiment of the invention.

FIG. 4 depicts another embodiment of a structural supporting complex 26a wherein a plurality of panels, partially represented by 10b, 11b and 12b, are longitudinally adjacently detachably interlocked with each other into panel groups by, preferably, the first connecting means (not shown) as described for FIG. 1. The transverse end of such panel groups is detachably connected to the longitudinal edge of at least one generally longitudinally extending panel 30 by, preferably, the second connecting means (not shown) as described for FIG. 1. The panel groups are usually positioned in generally parallel rows with each panel group transversely spaced apart by at least one generally longitudinally extending panel 30 and longitudinally spaced apart from generally parallel panel groups by at least two panel inserts 29a. The inserts 29a are of suitable configuration and dimension to extend between and removably attach to panels adjacent thereto by means described for the panel groups.

To afford ease of replacing individual panels or panel groups within the described structural supporting complex, it is preferred that the first connecting means be employed for connecting joints between adjacent panels extending in a direction angular, and more preferably generally perpendicular, to the direction of travel of a moving body, such as the landing direction of an aircraft. Use of such first connecting means facilitates removal of the necessary panels from the side or narrow direction of a landing mat rather than requiring removal of a multiplicity of panels along the length of a runway. The second connecting means is preferably employed for connecting joints between adjacent panels extending in a direction generally parallel to the landing direction.

The structural supporting complex of the present invention is susceptible of being embodied with various alterations and modifications, which may differ from those described hereinbefore. For this reason, it is to be fully understood that all of the foregoing is intended to be illustrative and is not to be construed or interpreted as being restrictive or otherwise as limiting the present invention.

What is claimed is:

1. In a structural supporting complex comprising a plurality of detachably interlocking panels including connecting means on the longitudinal and transverse edges thereof, the improvement which comprises a first panel with a connector of a first connecting means on a transverse edge and a connector of a second connecting means on a longitudinal edge, and a second panel with a connector of a first connecting means on a longitudinal edge and a connector of a second connecting means on a transverse edge, the connectors of the first connecting means on the first and second panels adapted to be interlocked with each other and complementary connectors of the second connecting means on the first and the second panels adapted to be interlocked with each other, the first connecting means being dissimilar from the second connecting means, the panels being suitably interlockingly positioned adjacent to each other with the adjacent first connectors and the adjacent second connectors being detachably interlocked to provide a supporting complex with discontinuous linearly extending joints therebetween.

2. The improvement of claim 1 wherein the panel transverse edges are interlocked with the longitudinal edges of adjacent panels.

3. The improvement of claim 2 wherein the panels are generally longitudinally detachably interlocked in multi-panel groups, the panel groups being detachably interlocked with and generally transversely spaced apart by a generally longitudinally extending panel and detachably interlocked with and generally longitudinally spaced apart by at least one panel insert, the generally longitudinally extending panels being longitudinally interlocked with and spaced apart by the panel groups and the panel inserts.

4. The improvement of claim 3 wherein each panel group comprises three panels.

5. The improvement of claim 4 wherein the panels are interlockingly positioned to avoid movement of adjacent panels relative to each other in directions parallel and transverse to the upper surface of the panels.

6. The improvement of claim 3 wherein the panels are interlockingly positioned to avoid movement of adjacent panels relative to each other in directions parallel and transverse to the upper surface of the panels.

7. The improvement of claim 6 wherein the connecting means on the transverse panel edge is adapted to interlock with the connecting means on the longitudinal edge of an adjacent panel.

8. The improvement of claim 2 wherein the panels are detachably interlocked in a plurality of substantially rectangular detachably interlocked multipanel groups.

9. The improvement of claim 8 wherein each panel group comprises three panels.

10. The improvement of claim 8 wherein the longitudinal dimension of the panel is from two to six times the transverse dimension.

11. The improvement of claim 8 wherein each panel group in a generally longitudinally extending panel row is spaced apart by at least two generally transversely extending panel groups.

12. The improvement of claim 1 wherein the joints extend linearly for up to about one and one-half the length of a single panel.

13. The improvement of claim 1 wherein the panel longitudinal dimension is an integer multiple of the transverse direction greater than one.

14. The improvement of claim 1 wherein the structural supporting complex is adapted for use as an aircraft runway.

15. The improvement of claim 14 wherein the aircraft runway is resistant to rutting and bow wave.

16. The improvement of claim 1 wherein the panels are interlockingly positioned to avoid movement of adjacent panels relative to each other in directions parallel and transverse to the upper surface of the panels.

17. The improvement of claim 1 wherein transverse portions of the first panel are positioned adjacent to longitudinal portions of the second panel, the first connecting means includes a locking bar adapted to be slidably received within suitable receptacles in the connectors of the first connecting means and the panels are positioned with the locking bar in a generally perpendicular direction to the length of the supporting complex.

18. An improved method of laying a structural supporting complex comprising detachably interlockingly positioning a plurality of panels adjacent to each other, the improvement which comprises providing a first panel with a connector of a first connecting means on a transverse edge and a connector of a second connecting means on a longitudinal edge, and a second panel with a connector of a first connecting means on a longitudinal edge and a connector of a second connecting means on a transverse edge, the connectors of the first connecting means on the first and second panels adapted to be interlocked with each other and complementary connectors of the second connecting on the first and the second panels adapted to be interlocked with each other, the first connecting means being dissimilar from the second connecting means; positioning the first and the second panels adjacent to each other; and detachably interlocking the adjacent first connectors and the adjacent second connectors to provide a supporting complex with discontinuous linearly extending joints therebetween resistant to rutting and bow wave.

19. The method of claim 18 including laying a structural supporting complex adapted for use as an aircraft runway.

20. The method of claim 18 including interlockingly positioning the panels to avoid movement of adjacent panels relative to each other in directions parallel and transverse to the upper surface of the panels.

21. The method of claim 18 including positioning transverse portions of the first panel adjacent to longitudinal portions of the second panel.

* * * * *

UNITED STATES PATENT OFFICE
CERTIFICATE OF CORRECTION

Patent No. 3,840,308            Dated October 8, 1974

Inventor(s) Gordon K. Glaza

It is certified that error appears in the above-identified patent and that said Letters Patent are hereby corrected as shown below:

Column 5, line 29, delete "1" and insert -- 9 --.

Signed and sealed this 11th day of February 1975.

(SEAL)
Attest:

RUTH C. MASON
Attesting Officer

C. MARSHALL DANN
Commissioner of Patents
and Trademarks